United States Patent Office 3,543,103
Patented Nov. 24, 1970

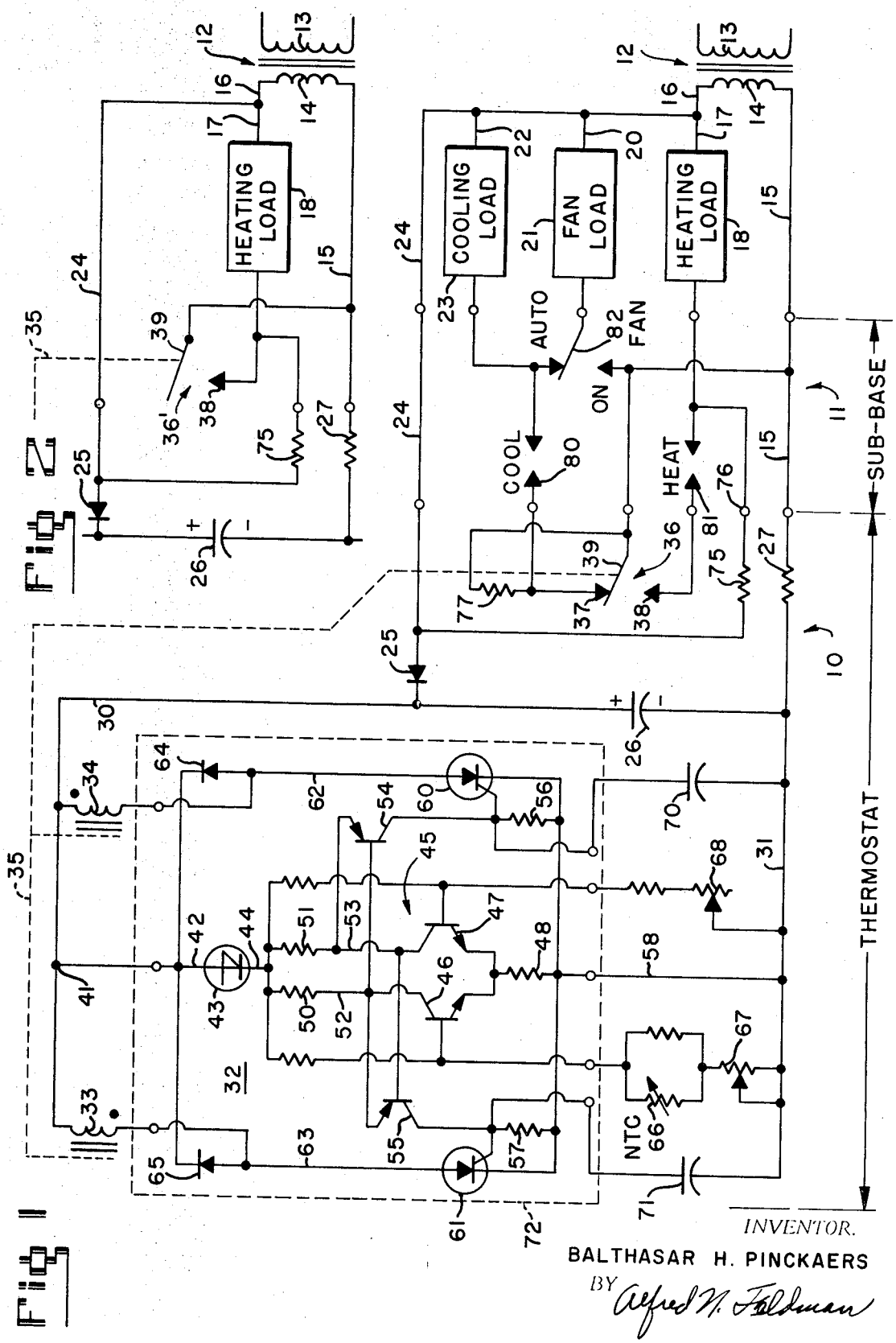

---

3,543,103
PULSE OPERATED CONDITION CONTROL DEVICE
Balthasar H. Pinckaers, Edina, Minn., assignor to Honeywell Inc., Minneapolis, Minn., a corporation of Delaware
Filed June 11, 1968, Ser. No. 736,088
Int. Cl. H01h 47/32
U.S. Cl. 317—148.5                    2 Claims

ABSTRACT OF THE DISCLOSURE

A solid state temperature control device that uses a bridge and amplifier network to fire solid state switching devices through a bistable switch means disclosed as a polarized relay. The power for the bridge and amplifier means is supplied from an integrating circuit through a voltage breakdown device so that pulses of energy are periodically applied to the bridge and amplifier for operation of the device.

BACKGROUND OF THE INVENTION

The present invention is of particular utility in the field of temperature control where it is essential to keep the dissipation of energy in the temperature sensing device to an absolute minimum and where the device is subject to unusual or excessive vibration. Most temperature control systems that utilize thermostats and conventional relaying are subject to problems when exposed to mechanical vibration. This is particularly true in systems which use a bimetal and switch arrangement. Conventional electronic thermostats also normally draw power continuously from their energizing source thereby requiring a dissipation in the thermostat of a certain amount of heat. This heat causes problems in accuracy and stability of the thermostat and is not desirable.

SUMMARY OF THE INVENTION

The present invention is directed particularly to a solid state temperature control system that utilizes a thermistor for sensing and control by way of a bridge and an amplifier. The amplifier has an output which reverses in polarity depending on whether the sensor for the bridge is above or below the set point for the device. Each of the two possible output polarities, if of sufficient magnitude, is allowed to operate one of two silicon controlled rectifiers. The silicon controlled rectifiers each are connected to one coil of a polarized relay so that the polarized relay can operate a switch dependent on whether the temperature responsive sensor is exposed to a temperature above or below the set point.

The device involved is powered by an integrating network made up of a diode, capacitor, and resistor connected to an alternating current source. The capacitor charges slowly over a large number of line cycles and eventually is discharged by the breakdown of a voltage breakdown device such as a four-layer diode to periodically supply the capacitor voltage to the bridge and amplifier. This periodic application of power keeps the dissipation of the system to a minimum and the manner in which this is done makes the system substantially independent of line voltage variations.

BRIEF DESCRIPTION OF THE DRAWING

FIG. 1 discloses a circuit diagram of a complete temperature control system wherein a thermostat, subbase, heat load, cooling load, and power supply make up the entire system.

FIG. 2 is a partial schematic which shows the system with a heat load only.

DESCRIPTION OF THE PREFERRED EMBODIMENT

In FIG. 1 a complete heating and cooling temperature control system is disclosed. A condition responsive means 10 in the form of a thermostat is mounted on and connected to a subbase means 11 which is connected to a power supply 12. The power supply 12 includes a transformer primary 13 which is connected to a source of conventional alternating current. A stepdown secondary winding 14 supplies power for the system. The secondary winding 14 has a conductor 15 that passes through the subbase means 11 to the condition responsive means or thermostat 10. The other side of secondary winding 14 is connected to conductor 16. Conductor 16 is connected by a conductor 17 to a heating load 18 which can be any type of heat activating device. Conductor 16 is also connected to conductor 20 which in turn is connected to a fan load 21 which normally is the fan relay for a cooling system. Conductor 16 is further connected by conductor 22 to a cooling load 23. The heating load 18, fan load 21, and cooling load 23 are conventional in a temperature controlling system and will not be described further other than to indicate that in order to properly operate the system, these loads must be selected by the subbase switch settings and response of the balance of the system.

Conductor 16 is connected to a further conductor 24 that forms a second main power conductor to the thermostat means 10. The conductors 15 and 24 pass through the subbase means 11 to supply power to a diode 25, a capacitor 26, and a resistor 27. The diode 25, capacitor 26, and resistor 27 form an integrating means. The current passing between conductors 15 and 24 through the diode 25 charges the capacitor 26 and is limited by resistor 27 so that capacitor 26 charges at a relatively slow rate as compared to the frequency of the applied alternating current.

The voltage across capacitor 26 is supplied by conductors 30 and 31 to a condition responsive circuit means generally disclosed at 32. The conductor 30 passes through a pair of polarized relay coils 33 and 34. The relay coils 33 and 34 are connected at 35 to operate a single pole double throw switch disclosed at 36 and which includes the fixed contacts 37 and 38 along with the movable member 39. The movable member 39 is magnetic in nature and is associated with a permanent magnet (not shown) that keeps the movable member 39 in the position in which it is moved by the coils 33 and 34. This polarized relay can be of any conventional type having two coils and in its broader sense is a bistable switch means which includes two separate control circuits for the switch means. The function of the polarized relay including the coils 33 and 34 will be brought out in connection with the description of the operation of the overall device.

Conductor 30 is connected at junction 41 to a conductor 42 that in turn is connected through a voltage breakdown means 43 that has been disclosed as a four-layer diode. The voltage breakdown device 43 could be of any conventional type such as the disclosed four-layer diode or could be a gas tube or other voltage breakdown means which has a threshold breakdown voltage and then a freely conducting state. The four-layer diode 43 in turn is connected by conductor 44 to a conventional bridge circuit means 45. The bridge circuit means 45 includes a differential amplifier comprising a pair of transistors 46 and 47 which conduct through a common circuit element 48. The transistors 46 and 47 conduct through a pair of resistors 50 and 51 and when the conduction of the transistors 46 and 47 through the common conductor 48 is balanced there is no voltage difference between a pair of conductors 52 and 53. At any time that the bridge means 45 is unbalanced the transistors 46 and 47 conduct unequally and there is a difference of potential between the conductors 52 and 53. To utilize this voltage difference a pair of transistors 54 and 55 have their emitter and base circuits connected across the conductors 52 and 53 thereby appropriately amplifying any difference. When there is a sufficiently large difference in voltage between conductors 52 and 53 only one of the transistors 54 or 55 will be driven into conduction. When transistor 54 conducts a voltage is generated across a resistor 56. When transistor 55 conducts a voltage is generated across a resistor 57. The conduction through resistors 56 or 57 is to the common conductor 58 which in turn is connected to conductor 31.

It will be noted that the resistors 56 and 57 are in the gate circuits of a pair of silicon controlled rectifiers 60 and 61. Silicon controlled rectifier 60 has a cathode-to-anode circuit including conductor 62 that is connected to the coil 34. The cathode-to-anode circuit of the silicon controlled rectifier 61 is connected by conductor 63 to the coil 33. A pair of diodes 64 and 65 are connected between the conductors 62 and 63 respectively through the common conductor 42 and form a free wheeling diode arrangement which is conventional where inductive loads are used with solid state devices.

The base of transistor 46 has a resistance network that is connected to conductor 31 and includes a temperature responsive resistance or sensor 66 in the form of a negative temperature coefficient thermistor, and a potentiometer 67 that acts as a setpoint resistance for the system. Connected between the base of the transistor 47 and the conductor 31 is a potentiometer 68 that is used for calibration purposes. A pair of capacitors 70 and 71 are connected between the gates of the silicon controlled rectifiers 60 and 61 and the conductor 31 to bypass any transient voltages, as is conventional.

It will be noted that a block indicated at 72 encloses the solid state components along with the resistors and conductors that make up a good portion of the present circuitry. The portion blocked out at 72 can be readily integrated into a solid state integrated circuit or can be made up of discrete components. Since the portion of the circuitry enclosed in block 72 contains only solid state elements, resistors, and conductors, the formation of this element as an integrated chip can be readily accomplished and the voltage breakdown device 43 and the two silicon controlled rectifiers 60 and 61 can be integrated in a form different than is shown herein.

The balance of the circuit for the condition responsive means or thermostat 10 includes a heating anticipator resistor 75 that is connected between conductor 24 and a terminal 76 in the thermostat means 10. Also disclosed is a cooling anticipator resistor 77 that is connected between contact 37 and movable member 39 of the switch contact members of the polarized relay.

The subbase means 11 completes the system and includes a switch means 80 for application of the system when cooling is desired and switch means 81 for use of the system when heating is desired. Also in the subbase means 11 is a manual switch means 82 for operation of the fan when that is desired. The subbase means 11 is disclosed with both the heating and cooling switches in an open position thereby leaving the system in an inactive state. The function of these switches will be brought out in connection with the operation of the overall system.

In FIG. 2 a simplified arrangement is disclosed wherein the subbase means 11 has been removed completely and only the connection to the thermostat means 10 and the heating load 18 is disclosed. The function of the system, however, is the same and it is believed that when the operation of the system as disclosed in FIG. 1 is completed that the operation of the portion of the system disclosed in FIG. 2 will be apparent. For convenience the same number has been used in both FIGS. 1 and 2 so that these figures can be readily compared.

OPERATION

If the system disclosed in FIG. 1 is to be used for control of the heating load 18, the switch means 81 would be closed thereby connecting the heating load 18 through the subbase means 11 to the thermostat means 10. It is first assumed that the thermostat means 10 is satisfied, that is to say the negative temperature coefficient thermistor 66 senses a temperature in agreement with the value to which the thermostat means 10 has been set. The bridge means 45 is then balanced and there will be no difference in potential generated across the conductors 52 and 53. At this time the secondary 14 of transformer 12 is connected across the integrating circuit made up of diode 25, capacitor 26, and resistor 27. The diode 25 allows the capacitor 26 to take a charge each time the diode 25 allows conduction. The resistor 27 has been selected so as to be large enough to limit the current in the integrating circuit of diode 25, capacitor 26, and resistor 27 so that the capacitor 26 takes on only a small amount of charge during each cycle of the applied alternating current. The voltage on capacitor 26 is applied across the voltage breakdown means 43 and the bridge means 45. The bridge means 45 is assumed to be balanced so that when the voltage across capacitor 26 reaches a level sufficient to breakdown the voltage breakdown means 43, the conduction through resistors 50 and 51 is equal and the transistors 54 and 55 do not conduct. Therefore the silicon controlled rectifiers 60 and 61 do not conduct and there is no energy in the coils 33 and 34. The voltage breakdown means 43 is selected so that it will discharge the capacitor 26 at approximately 6 to 8 second intervals with a normal alternating current applied to the transformer 12.

If it is now assumed that the temperature sensed by the negative temperature coefficient thermistor 66 decreases, thereby calling for heat from the heating load 18, the bridge means 45 becomes unbalanced. As soon as the voltage breakdown means 43 breaks down applying voltage to the bridge means 45, there will be a difference in current flow through the resistors 50 and 51 thereby causing the transistor 54 to conduct. The unbalance of the bridge causes the transistor 54 to conduct and a voltage is generated across resistance 56, and if the voltage is of sufficient magnitude the silicon controlled rectifier 60 will fire. When the silicon controlled rectifier 60 conducts current is drawn through coil 34 of the polarized relay. A pulse of energy from the capacitor 26 is drawn through the coil 34 and the silicon controlled rectifier 60 that discharges or substantially discharges the capacitor 26. The coil 34 activates through the connection 35 the movable member 39 of the switch contact means 36 and moves the contact 39 so that it engages contact 38 to supply energy through the heating contact 81 of the subbase means 11. This connects the heating load 18 to the conductor 15 thereby supplying the necessary energy to the heating load 18 to bring it into operation. If it is assumed that the heating load 18 is a furnace and that heat is supplied to the area in which the thermostat means 10 is located, it is obvious that the thermostat means 10 will start to respond to that added heat. During the period of time in which the thermostat means 10 is responding it is pulsed at 6 to 8 second intervals by the discharge of the capacitor 26 through the voltage breakdown means 43. This discharge fires the silicon controlled rectifier 60 each time but the operation of the silicon controlled rectifier through the coil 34 does not change position of the contact member 39. It merely reenforces the fact that it is already in the position calling for heat. It is obvious that this pulsing will continue until the thermistor 66 rebalances the bridge means 45. The rebalancing of bridge means 45 does not change the position of the switch member 39 in the relay and it continues to operate the heating load 18. As soon as the heating load 18 drives the temperature at the thermisor 66 slightly above the set temperature, the bridge means 46 unbalances in an opposite direction from that which it was originally unbalanced. This slight unbalance in the opposite direction then causes the silicon controlled rectifier 61 to fire. Once the silicon controlled rectifier 61 fires it conducts through coil 33 from the capacitor 26 pulsing the bistable switch means or polarized relay so as to move the element 39 to engage contact 37. This opens the circuit of the heating load 18 and the heating load thereby is deactivated. Any further pulsing of the relay member 39 by the conduction of the silicon controlled rectifier 61 merely keeps it in a position to which it has been moved and to which it is shown in FIG. 1. It is thus apparent that the polarized relay or bistable switch means moves only once and then stays in the position to which it is moved until the bridge means 45 rebalances and goes slightly in the opposite direction from which it was originally unbalanced.

If the present system calls for cooling instead of heating, switch means 80 is closed instead of 81. In this case, the cooling load 23 would be connected through the subbase means 11 to the thermostat means 10 and the system would operate in the same fashion as described, but on a reverse operation of the silicon controlled rectifiers 60 and 61. The fan switch 82 can be left in the position shown in which case the fan load 21 operates only when the switch 39 is in contact with the contact member 37. The fan switch 82 could be placed in the lower position shown in FIG. 1 and would continuously energize the fan load 21 by placing the fan load 21 directly across the secondary 14 of transformer 12. This is a conventional operating mode for heating and cooling with a subbase connecting the controlled system to the thermostat means 10.

In FIG. 2 a system disclosing a heating load 18 only has been disclosed and the subbase means 11 is excluded. The bistable switch means of the present invention then includes a single pole, single throw type of switch 36'. The operation of system disclosed in FIG. 2 is similar to that of FIG. 1 and will not be described again.

From the description of the operation of the present system, it is obvious that the present system is unique in that the capacitor 26 supplies an operating voltage through the voltage breakdown means 43 only at periodic intervals. With the pulsing of the bridge means 45 at 6 to 8 second intervals the dissipation of power in the thermostat means 10 is exceedingly low. This keeps the thermostat from being affected by heat dissipated within itself. Also, the fact that capacitor 26 is fired through the breakdown means 43 periodically eliminates the undesirable effect of any line voltage transient that might ordinarily be applied to the transformer 12. If a slight increase or decrease in line voltage exists, the only effect on the system is that the capacitor 26 will take on its charge at a more rapid or slower rate than before. It will not change the basic operation of the system. Also if a line voltage transient occurs it will merely increase the firing rate of the pulses by a slight amount and not affect the balance of the system.

The system disclosed in detail in FIG. 1 could readily be adapted to be used for a heating and cooling application wherein a single pole, single throw configuration of switch 36' forms part of the bistable switch means as it is used in FIG. 2. This can be accomplished by the use of a conventional reversing switch connected between the coils 33 and 34 and the conductors 62 and 63 so that these connections can be reversed. Such a conventional reversing switch can be incorporated in the subbase 11.

It is obvious that the present system is unique in that the voltage integrating means in the form of the slowly charged capacitor is fired through the breakdown in diode 43 periodically to control a bistable switch which stays in the position to which it is placed by the first operation. The subsequent repetitive operation does not change the state of the system and the system must remain fixed until the condition sensed changes sufficiently to unbalance the condition responsive circuit means to the opposite condition thereby undoing the originally set condition of the system. Since the present invention could be varied extensively by changes in minor circuit components, the applicant wishes to be limited in the scope of his invention solely by the scope of the appended claims.

The embodiments of the invention in which an exclusive property or right is claimed are defined as follows:

1. A condition control device adapted to be connected to an alternating current source, including; direct current voltage source means energized from said alternating current source and including a resistor in series circuit with a capacitor to charge said capacitor over a number of cycles of said alternating current source; polarized relay means having two coils for differential operation of said relay means with a first terminal of each of said coils connected to a first terminal of said capacitor; a four layer diode having a threshold conduction voltage and including a first terminal connected in common with said first terminals of said coils and said capacitor; condition responsive differential amplifier means having an input circuit connected between a second terminal of said diode and a second terminal of said capacitor to periodically discharge said capacitor when said capacitor charges to said diode threshold conduction voltage; a first and a second solid state controllable switch each connected to a separate second terminal of said relay coils and said second terminal of said capacitor whereby said switches are capable of discharging said capacitor through one of said coils upon operation of one of said solid state controllable switch; and said condition responsive differential amplifier means having output circuit means connected to said solid state controllable switches to operate one of said solid state controllable switches upon said condition responsive differential amplifier means being unbalanced to thereby energize one of said relay coils from the energy stored in said capacitor; said capacitor energy being discharged through said four layer diode and said differential amplifier means alone when said amplifier means is in a balanced state.

2. A condition control device adapted to be connected to an alternating current source as described in claim 1 wherein said condition responsive differential amplifier means includes a resistive bridge and a solid state differential amplifier; and said solid state controllable switches are each silicon controlled rectifiers.

References Cited
UNITED STATES PATENTS

| | | | |
|---|---|---|---|
| 3,290,486 | 12/1966 | Mordwinkin | 219—499 |
| 3,377,545 | 4/1968 | Tveit | 323—19 |
| 3,182,222 | 5/1965 | Lacy et al. | 317—148.5 |
| 3,329,887 | 7/1967 | Schaeve | 323—22 |

J D MILLER, Primary Examiner

C. L. YATES, Assistant Examiner

U.S. Cl. XR.

317—132, 153, 155.5